(12) United States Patent
Chamberlin, III et al.

(10) Patent No.: US 6,408,812 B1
(45) Date of Patent: Jun. 25, 2002

(54) METHOD OF OPERATING SPARK-IGNITION FOUR-STROKE INTERNAL COMBUSTION ENGINE

(75) Inventors: William Bricker Chamberlin, III, Kirtland; John Kent Pudelski, Cleveland Heights; George Steven Szappanos, Mentor, all of OH (US)

(73) Assignee: The Lubrizol Corporation, Wickliffe, OH (US)

( * ) Notice: Subject to any disclaimer, the term of this patent is extended or adjusted under 35 U.S.C. 154(b) by 0 days.

(21) Appl. No.: 09/664,834

(22) Filed: Sep. 19, 2000

(51) Int. Cl.$^7$ .................................................. F01L 9/02
(52) U.S. Cl. ................................................. 123/196 R
(58) Field of Search ........................ 123/196 M, 196 R, 123/73 AD, 196 S; 184/6.5, 6.6, 6.7, 6.8, 6.9, 29, 103.1, 104, 105.1

(56) References Cited

U.S. PATENT DOCUMENTS

| 4,392,463 A | 7/1983 | Yasuhara ............... 123/196 M |
| 4,869,346 A | 9/1989 | Nelson ....................... 184/1.5 |

(List continued on next page.)

FOREIGN PATENT DOCUMENTS

| FR | 2 605 677 | 10/1986 |
| GB | 2315812 A | 2/1998 |

OTHER PUBLICATIONS

U.S. application Ser. No. 09/727,622, filed Dec. 1, 2000.
U.S. application Ser. No. 09/726,618 filed Dec. 1, 2000.

(List continued on next page.)

*Primary Examiner*—Marguerite McMahon
(74) *Attorney, Agent, or Firm*—Neil A. DuChez; David M. Shold; Michael F. Esposito

(57) ABSTRACT

This invention relates to a method of operating a spark ignition four-stroke internal combustion engine comprised of a valve train and a crankcase and equipped with an exhaust gas aftertreatment device, said method comprising:

(A) operating said engine using a gasoline fuel composition, the exhaust gas from the operation of said engine being advanced through said aftertreatment device;

(B) lubricating said crankcase using a first lubricating oil composition, said first lubricating oil composition optionally containing an extreme-pressure additive comprised of metal and phosphorus, provided the amount of phosphorus contributed to said first lubricating oil composition does not exceed about 0.04% by weight based on the weight of said first lubricating oil composition; and (C) lubricating said valve train using a second lubricating oil composition.

In one embodiment, the inventive method further comprises the following additional steps:

(D) removing part of said first lubricating oil composition from said crankcase, said removed part of said first lubricating oil composition (i) being combined with said gasoline fuel composition and consumed with said gasoline fuel composition as said engine is operated or (ii) being combined with the exhaust gas from said engine and removed from said engine with said exhaust gas, said first lubricating oil composition being characterized by the absence of extreme pressure additives comprised of metal and phosphorus; and (E) adding an additional amount of said first lubricating oil composition to said crankcase to replace said removed part of said first lubricating oil composition.

33 Claims, 5 Drawing Sheets

U.S. PATENT DOCUMENTS

| | | | | |
|---|---|---|---|---|
| 5,052,355 | A | * 10/1991 | Ito et al. | 123/196 R |
| 5,195,474 | A | 3/1993 | Urata et al. | 123/90.12 |
| 5,390,762 | A | 2/1995 | Nelson | 184/1.5 |
| 5,709,186 | A | 1/1998 | Taue | 123/196 W |
| 5,955,403 | A | 9/1999 | Wong | 508/282 |
| 6,001,783 | A | * 12/1999 | Manka et al. | 508/428 |

OTHER PUBLICATIONS

U.S. application Ser. No. 09/728,006, filed Dec. 1, 2000.

U.S. application Ser. No. 09/729,519 filed Dec. 4, 2000.

McGeehan et al.; "Gasoline–Engine Camshaft Wear: The Culprit is Blow–By"; *SAE Technical Paper Series*, Paper No. 892112..

Saunders; "Engine Makers Show Extended Drain Tunnel Vision"; *Hart's Lubricants World*, Jun. 1997, pp. 14–17.

Cummins Engine Inc., Cummins Centinel™ Advanced Engine Oil Management System, http://cecoewww.cummins.com/partserv/centinel.html, Jul. 1, 1999.

Webb Enterprises, Inc., Product Literature entitled "Webb Dial Your Oil Change."

Power Plus Corporation, Product Literature entitled "Ren Model 119 Burnoff Continuous Oil Change System."

* cited by examiner

METHOD OF OPERATING SPARK-IGNITION FOUR-STROKE INTERNAL COMBUSTION ENGINE

TECHNICAL FIELD

This invention relates to a method of operating a spark-ignition, four-stroke internal combustion engine. More particularly, this invention relates to a method of operating a spark-ignition, four-stroke internal combustion engine wherein the valve train area of the engine and the crankcase section are separated from each other and are lubricated separately.

BACKGROUND OF THE INVENTION

A problem associated with conventional spark-ignition four-stroke internal combustion engines equipped with exhaust gas aftertreatment devices (e.g., catalytic converters, particulate traps, etc.) is that the lubricating oils for such engines are used in both the crankcase as well as in high wear areas such as the valve train. Because these oils are used in high wear areas they usually contain extreme pressure (EP) agents, which typically contain metal and phosphorus, in order to be effective. During the operation of the engine these EP agents decompose and the resulting decomposition products eventually enter the aftertreatment device resulting in damage to the device. The problem therefore is to provide a lubricant system that adequately addresses the antiwear protection needs of the high wear areas of the engine and yet reduces or avoids damage to the exhaust gas aftertreatment device.

Another problem associated with these engines is that blow-by exhaust gases generated in the crankcase of the engine come into contact with the cam shaft used in the valve train system. Blow-by exhaust gases have been found to be a primary factor affecting cam shaft wear. The problem therefore is to provide a method for preventing the blow-by gases from contacting the cam shaft and thereby prevent excessive wear of the cam shaft.

Another problem associated with the use of conventional spark-ignition four-stroke engines is that oil change intervals lag behind other service intervals. Oil changes are viewed as one of the most aggravating and, in some cases, most costly maintenance aspects of vehicle ownership. Traditionally, intervals have been extended by base stock and additive upgrades. Since the 1920s, for example, the extension has been 15x or greater, depending on what is considered the current drain interval. Regardless of this progress, improvements in oil change maintenance have consistently lagged other service intervals such as air filters, brake replacement, and coolant changes. The problem therefore is to improve the lubricant technology for these engines so that the required time interval between oil changes can be increased.

The present invention provides a solution to each of these problems. With the present invention lubricating oil compositions characterized by a low-level amount of or the absence of harmful EP agents are used in the crankcase section of the engine and therefore the exhaust gas aftertreatment device is protected from harmful exposure to such agents. Also, because the cam shaft of the engine is separated from the crankcase section of the engine, harmful blow-by exhaust gases generated in the crankcase do not come into contact with the cam shaft and therefore do not cause wear in the cam shaft. In accordance with one embodiment of the invention, the oil change intervals for these engines are extended due to the fact that used crankcase oil is continuously or periodically removed from the crankcase and replaced with new oil.

U.S. Pat. No. 4,392,463 discloses a diesel engine having a first lubrication system, containing conventional engine oil, used to lubricate that section of the engine subjected to excessive wear-the valve train including the cam shaft, valve lifters, rocker arm, valve stems, etc., and a second lubricant system, utilizing diesel fuel, for lubricating the remaining section of the engine-the crankshaft and associated parts, pistons, connecting rods, etc. By being exposed to crankcase blowby exhaust gases, diesel fuel used to lubricate the crankshaft, etc. absorbs pollutants and contaminants contained therein and recirculates these contaminants through the fuel system to be burned and exhausted. By constantly being lubricated with fresh lubricant, wear on these specific parts is reduced. The reference indicates that frequent lubrication changes have been eliminated because the diesel fuel/lubricant is continuously changed and circulated through the fuel system. Since the engine oil and the first lubrication system is not exposed to crankcase blowby exhausted gases, its useful life is prolonged, thus reducing the frequency of required oil changes.

SUMMARY OF THE INVENTION

This invention relates to a method of operating a spark ignition four-stroke internal combustion engine comprised of a valve train and a crankcase and equipped with an exhaust gas aftertreatment device, said method comprising:

(A) operating said engine using a gasoline fuel composition, the exhaust gas from the operation of said engine being advanced through said aftertreatment device;

(B) lubricating said crankcase using a first lubricating oil composition, said first lubricating oil composition optionally containing an extreme-pressure additive comprised of metal and phosphorus, provided the amount of phosphorus contributed to said first lubricating oil composition by said extreme-pressure additive does not exceed about 0.04% by weight based on the weight of said first lubricating oil composition; and (C) lubricating said valve train using a second lubricating oil composition.

In one embodiment, the inventive method further comprises the following additional steps:

(D) removing part of said first lubricating oil composition from said crankcase, said removed part of said first lubricating oil composition (i) being combined with said gasoline fuel composition and consumed with said gasoline fuel composition as said engine is operated or (ii) being combined with the exhaust gas from said engine and removed from said engine with said exhaust gas, said first lubricating oil composition in this embodiment being characterized by the absence of extreme pressure additives comprised of metal and phosphorus; and (E) adding an additional amount of said first lubricating oil composition to said crankcase to replace said removed part of said first lubricating oil composition.

BRIEF DESCRIPTION OF THE DRAWINGS

In the annexed drawings, like parts and features have like references.

DESCRIPTION OF THE PREFERRED EMBODIMENTS

Figure 1:
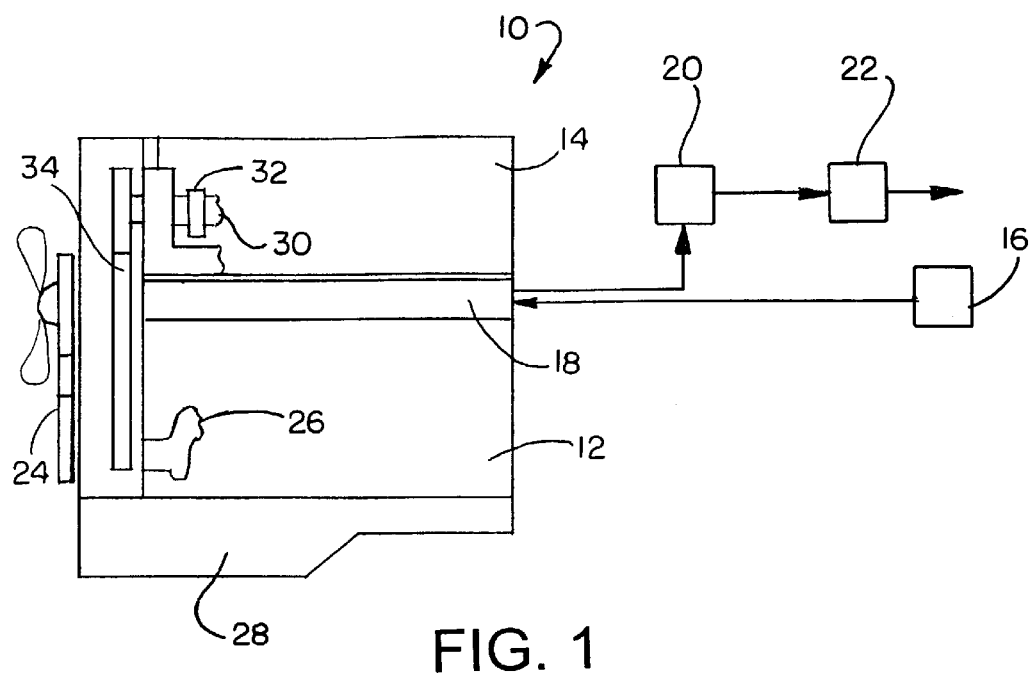
FIG. 1 is a schematic illustration of a spark ignition four-stroke internal combustion engine that is useful in accordance with one embodiment of the inventive method.

The term "exhaust gas aftertreatment device" is used herein to refer to any mechanical device used in the exhaust gas system of an internal combustion engine to reduce pollutants in the exhaust gas. These include catalytic converters, particulate traps, and the like.

The term "consumable oil" is used herein to refer to an oil composition that may be either (i) mixed with and consumed with the gasoline fuel composition used in the inventive method, or (ii) mixed with the exhaust gas produced during the operation of the inventive method and removed from the engine as said method is performed.

The term "non-consumable oil" is used herein to refer to an oil composition that is not a consumable oil.

The term "hydrocarbyl" denotes a group having a carbon atom directly attached to the remainder of the molecule and having a hydrocarbon or predominantly hydrocarbon character within the context of this invention. Such groups include the following:

(1) Hydrocarbon groups; that is, aliphatic, (e.g., alkyl or alkenyl), alicyclic (e.g., cycloalkyl or cycloalkenyl), aromatic, aliphatic- and alicyclic-substituted aromatic, aromatic-substituted aliphatic and alicyclic groups, and the like, as well as cyclic groups wherein the ring is completed through another portion of the molecule (that is, any two indicated substituents may together form an alicyclic group). Such groups are known to those skilled in the art. Examples include methyl, ethyl, octyl, decyl, octadecyl, cyclohexyl, phenyl, etc.

(2) Substituted hydrocarbon groups; that is, groups containing non-hydrocarbon substituents which, in the context of this invention, do not alter the predominantly hydrocarbon character of the group. Those skilled in the art will be aware of suitable substituents. Examples include halo, hydroxy, nitro, cyano, alkoxy, acyl, etc.

(3) Hetero groups; that is, groups which, while predominantly hydrocarbon in character within the context of this invention, contain atoms other than carbon in a chain or ring otherwise composed of carbon atoms. Suitable hetero atoms will be apparent to those skilled in the art and include, for example, nitrogen, oxygen and sulfur.

In general, no more than about three substituents or hetero atoms, and preferably no more than one, will be present for each 10 carbon atoms in the hydrocarbyl group.

Terms such as "alkyl-based," "aryl-based," and the like have meanings analogous to the above with respect to alkyl groups, aryl groups and the like.

The term "hydrocarbon-based" has the same meaning and can be used interchangeably with the term hydrocarbyl when referring to molecular groups having a carbon atom attached directly to the remainder of a molecule.

The term "lower" as used herein in conjunction with terms such as hydrocarbyl, alkyl, alkenyl, alkoxy, and the like, is intended to describe such groups which contain a total of up to 7 carbon atoms.

The term "oil-soluble" refers to a material that is soluble in mineral oil to the extent of at least about one gram per liter at 25° C.

The inventive method will be initially discussed with reference to FIG. 1. The engine 10 is a spark ignition four-stroke internal combustion engine comprised of a crankcase section 12 and a valve train section 14. The crankcase section 12 and the valve train section 14 are separated from each other sufficiently to permit them to be lubricated separately. A fuel system 16, which includes a fuel tank, fuel pump, fuel injectors, fuel filter, and the like, is provided for advancing fuel to the engine. A combustion section 18 is provided for combusting fuel in the combustion chambers of the engine, and removing exhaust gas from the engine. An exhaust gas aftertreatment device (e.g., catalytic converter, particulate trap, and the like) 20 and an exhaust muffler 22 are provided as part of an exhaust system for removing exhaust gas from the engine. The engine has a cooling system 24 which includes a cooling fan and a radiator. The crankcase section 12 includes all of the normal components of the crankcase of a spark ignition four-stroke internal combustion engine including a crank shaft 26, oil reservoir 28, and the like. The crankcase section 12 includes a pump (not shown) for circulating oil in the crankcase. The valve train section 14 includes all of the normal components of the valve train of a spark-ignition four-stroke internal combustion engine including a cam shaft 30, cams 32 as well as valve lifters, rocker arms, valve stems, and the like. The valve train section 14 includes an oil pump (not shown) for circulating oil in the valve train section. A timing chain 34 connects the crank shaft 26 and the cam shaft 30.

The engine 10 is entirely conventional with the exception that the crankcase section 12 is separated from the valve train section 14 sufficiently so that different lubricating oil compositions, which do not come into contact with each other, may be used to lubricate each section. Thus, in accordance with the inventive method, a first lubricating oil composition is used to lubricate the crankcase section 12, and a second lubricating oil composition is used to lubricate the valve train section 14. The lubricating oil composition used in the crankcase section 12 may be a consumable oil composition or a non-consumable oil composition. The engine 10 operates in the normal sequence with the fuel being advanced from the fuel system 16 to the combustion section 18 where it undergoes combustion, and the exhaust gas being removed from the combustion section 18 through the exhaust gas aftertreatment device 20 and exhaust muffler 22. An advantage of using this method is that harmful blow-by gases which are generated in the crankcase section 12 do not enter the valve train section 14 and thereby do not come into contact with the cam shaft 30.

Figure 2:
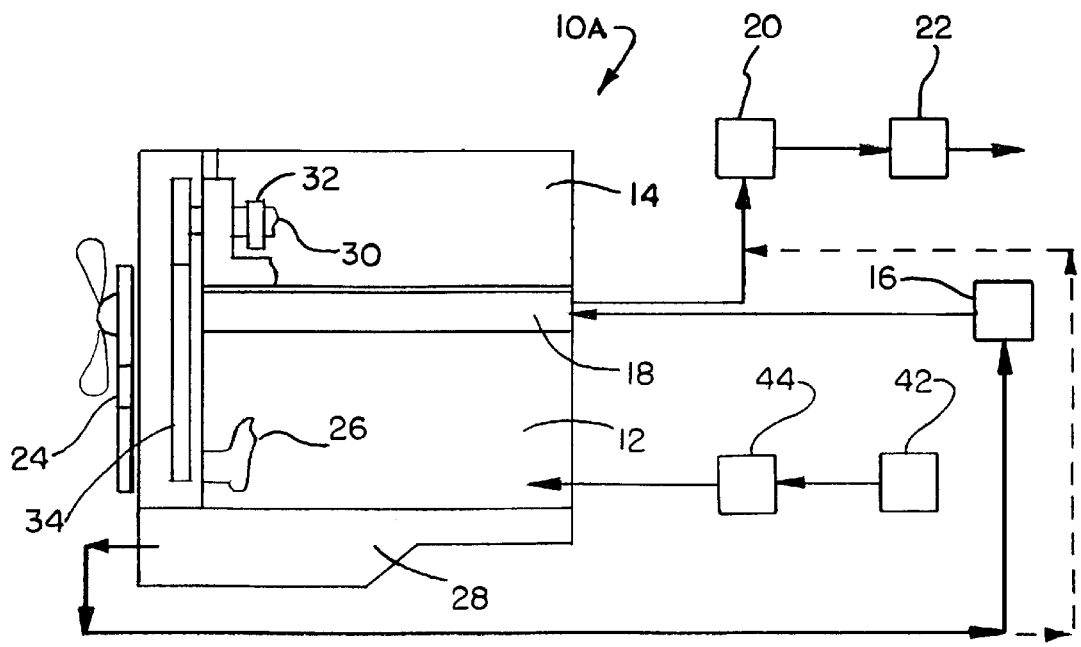
FIG. 2 is a schematic illustration of a spark ignition four-stroke internal combustion engine that is useful with another embodiment of the inventive method.

In the embodiment illustrated in FIG. 2, the engine 10A is identical to the engine 10 illustrated in FIG. 1 with the exception that the pump in the crankcase section 12 of the engine 10A is adapted for pumping oil from the oil reservoir 28 to either the fuel system 16 or to the exhaust system. The engine 10A is also equipped with a make-up oil reservoir 42 and a pump or metering device 44 for advancing oil from the make-up oil reservoir 42 to the crankcase section 12. The engine 10A is adapted for using a consumable lubricating oil composition as the crankcase oil in the crankcase section 12. During the operation of engine 10A, a portion of the first lubricating oil composition used in the crankcase section 12 may be pumped from oil reservoir 28 to fuel system 16 wherein it is combined with the fuel. The introduction of the oil into the fuel may occur in one or more of the fuel tank, fuel return line, fuel injectors, fuel valve guides, intake manifold, positive crankcase ventilation (PCV) system, exhaust gas recirculation (EGR) system, or air intake system of the engine 10A. The resulting combination of fuel and oil is comprised of about 0.01% to about 5% by weight of said oil, and in one embodiment about 0.05% to about 3% by weight, and in one embodiment about 0.1% to about 1.5% by weight, and in one embodiment about 0.1% to about 1% by weight, and in one embodiment about 0.1% to about 0.7% by weight, and in one embodiment about 0.1% to about 0.5% by weight, and in one embodiment about 0.2% to about 0.3% by weight of said oil. Alternatively (as shown in the dashed line in FIG. 2), the portion of the first lubricating oil composition removed from the oil reservoir 28 may be pumped to the exhaust gas system wherein it is combined with the exhaust gas of the engine. The introduction of the oil into the exhaust gas may occur in the exhaust gas system at any point upstream of (i.e., prior to entry into) the exhaust gas aftertreatment device 20.

In one embodiment, the engine 10 or 10A is used in combination with an automatic transmission and the second lubricating oil composition used to lubricate the valve train section 14 is also used as the automatic transmission fluid. This embodiment provides the advantage of using the pump provided with the automatic transmission as the pump for the lubricant in the valve train section 14.

In one embodiment, the engine 10 or 10A is used in combination with a power steering unit and the second lubricating oil composition used to lubricate the valve train section 14 is also used as the power steering fluid. This embodiment provides the advantage of using the pump provided with the power steering unit as the pump for the lubricant in the valve train section 14.

In one embodiment, the engine 10 or 10A is used in combination with both an automatic transmission and a power steering unit and the second lubricating oil composition used to lubricate the valve train section 14 is also used as the automatic transmission fluid and the power steering fluid. This embodiment provides the advantage of using the pump provided for either or both the automatic transmission and the power steering unit as the pump for the lubricant in the valve train section 14.

The Gasoline Fuel Composition.

The gasoline fuel compositions useful with the inventive method may be motor gasolines as defined by ASTM Specification D439. The fuel may comprise non-hydrocarbonaceous materials such as alcohols (e.g., methanol, ethanol). The fuel may be derived from vegetable or mineral oil sources including corn, alfalfa, shale and coal. Gasoline fuel compositions which are mixtures of one or more hydrocarbonaceous fuels and one or more non-hydrocarbonaceous materials may his be used. An example of such a mixture is gasoline and ethanol.

In one embodiment, the gasoline fuel composition is comprised of a mixture of hydrocarbons having an ASTM distillation range from about 60° C. at the 10% distillation point to about 205° C. at the 90% distillation point. In one embodiment, the gasoline fuel composition is an unleaded fuel composition. In one embodiment, the gasoline is a chlorine-free or low-chlorine gasoline characterized by a chlorine content of no more than about 10 ppm. In one embodiment, the gasoline is a low-sulfur fuel characterized by a sulfur content of no more than about 300 ppm, and in one embodiment no more than about 150 ppm, and in one embodiment no more than about 100 ppm, and in one embodiment no more than about 50 ppm, and in one embodiment no more than about 25 ppm, and in one embodiment no more than about 10 ppm.

The gasoline fuel compositions may contain one or more fuel additives known in the art for enhancing the performance of the fuel. These include deposit preventers or modifiers, dyes, antioxidants such as 2,6-di-tertiary-butyl-4-methyl-phenol, corrosion inhibitors such as alkylated succinic acids and anhydrides, bacteriostatic agents, gum inhibitors, metal deactivators, demulsifiers, upper cylinder lubricants, anti-icing agents, ashless dispersants, and the like.

The fuel additives may be added directly to the fuel, or they may be diluted with a normally liquid organic diluent such as naphtha, benzene, toluene, xylene to form an additive concentrate prior to addition to the fuel. These concentrates typically contain from about 10% to about 90% by weight diluent.

The First Lubricating Oil Composition.

The first lubricating oil composition used to lubricate the crankcase section 12 of the engine 10 (FIG. 1) may be a consumable oil composition or a non-consumable oil composition. The first lubricating oil composition used to lubricate the crankcase 12 of engine 10A (FIG. 2) is a consumable oil composition.

The consumable oil composition, in one embodiment, may be comprised of components that add only C, H, O or N to the lubricating oil composition. In one embodiment, Si may be present. Any other elements that may be present are present as impurities and as such are at relatively low concentrations. The concentration of such impurities (prior to use of the oil in the engine) is typically less than about 500 ppm, and in one embodiment less than about 250 ppm, and in one embodiment less than about 100 ppm, and in one embodiment less than about 50 ppm. This lubricating oil composition is characterized by the absence of EP additives comprised of metal (e.g., zinc) and phosphorus. In one embodiment, this composition is characterized by the absence of detergents or dispersants of the ash-producing type.

The non-consumable oil composition is the same as the consumable oil composition with the exception that the non-consumable oil may include a minor amount of one or more EP additives comprised of metal (e.g., zinc) and phosphorus, provided that the phosphorus content of the oil composition provided by such EP additives is no more than about 0.04% by weight. The non-consumable oil composition may also contain one or more detergents or dispersants of the ash-producing type.

The first lubricating oil composition is a lubricating oil composition that is comprised of one or more base oils which are generally present in a major amount (i.e. an amount greater than about 50% by weight). Generally, the base oil is present in an amount greater than about 60%, or greater than about 70%, or greater than about 80% by weight of the lubricating oil composition.

The first lubricating oil composition may have a viscosity of up to about 15cSt at 100° C., and in one embodiment about 5 to about 15cSt at 100° C., and in one embodiment about 6 to about 13 cSt at 100° C. In one embodiment, the first lubricating oil composition has an SAE Viscosity Grade of 0W, 0W-20, 0W-30, 0W-40, 0W-50, 10W-60, 5W, 5W-20, 5W-30, 5W-40, 5W-50, 5W-60, 10W, 10W-20, 10W-30, 10W-40 OR 10W-50.

The first lubricating oil composition may have a high-temperature/high-shear viscosity at 150° C. as measured by the procedure in ASTM D4683 of up to about 5 centipoise, and in one embodiment up to about 4 centipoise, and in one embodiment about 2 to about 4 centipoise, and in one embodiment about 2.2 to about 3.6 centipoise, and in one embodiment about 2.7 to about 3.5 centipoise.

The base oil used in the first lubricating oil composition may be a natural oil, synthetic oil or mixture thereof. The natural oils that are useful include animal oils and vegetable oils (e.g., castor oil, lard oil) as well as mineral lubricating oils such as liquid petroleum oils and solvent treated or acid-treated mineral lubricating oils of the paraffinic, naphthenic or mixed paraffinic-naphthenic types. Oils derived from coal or shale are also useful. Synthetic lubricating oils include hydrocarbon oils such as polymerized and interpolymerized olefins (e.g., polybutylenes, polypropylenes, propylene isobutylene copolymers, etc.); poly(1-hexenes), poly-(1-octenes), poly(1-decenes), etc. and mixtures thereof; alkylbenzenes (e.g., dodecylbenzenes, tetradecylbenzenes, dinonylbenzenes, di-(2-ethylhexyl) benzenes, etc.); polyphenyls (e.g., biphenyls, terphenyls, alkylated polyphenyls, etc.); alkylated diphenyl ethers and alkylated diphenyl sulfides and the derivatives, analogs and homologs thereof and the like.

Alkylene oxide polymers and interpolymers and derivatives thereof where the terminal hydroxyl groups have been modified by esterification, etherification, etc., constitute another class of known synthetic lubricating oils that can be used. These are exemplified by the oils prepared through polymerization of ethylene oxide or propylene oxide, the alkyl and aryl ethers of these polyoxyalkylene polymers (e.g., methyl-polyisopropylene glycol ether having an average molecular weight of about 1000, diphenyl ether of polyethylene glycol having a molecular weight of about 500–1000, diethyl ether of polypropylene glycol having a molecular weight of about 1000–1500, etc.) or mono- and polycarboxylic esters thereof, for example, the acetic acid esters, mixed $C_{3-8}$ fatty acid esters, or the $C_{13}$ Oxo acid diester of tetraethylene glycol.

Another suitable class of synthetic lubricating oils that can be used comprises the esters of dicarboxylic acids (e.g., phthalic acid, succinic acid, alkyl succinic acids, alkenyl succinic acids, maleic acid, azelaic acid, suberic acid, sebacic acid, fumaric acid, adipic acid, linoleic acid dimer, malonic acid, alkyl malonic acids, alkenyl malonic acids, etc.) with a variety of alcohols (e.g., butyl alcohol, hexyl alcohol, dodecyl alcohol, 2-ethylhexyl alcohol, ethylene glycol, diethylene glycol monoether, propylene glycol, etc.) Specific examples of these esters include dibutyl adipate, di(2-ethylhexyl) sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, the complex ester formed by reacting one mole of sebacic acid with two moles of tetraethylene glycol and two moles of 2-ethylhexanoic acid and the like.

Esters useful as synthetic oils also include those made from $C_5$ to $C_{12}$ monocarboxylic acids and polyols and polyol ethers such as neopentyl glycol, trimethylol propane, pentaerythritol, dipentaerythritol, tripentaerythritol, etc.

Silicon-based oils such as the polyalkyl-, polyaryl-, polyalkoxy-, or polyaryloxy-siloxane oils and silicate oils comprise another useful class of synthetic lubricants (e.g., tetraethyl silicate, tetraisopropyl silicate, tetra-(2-ethylhexyl)silicate, tetra-(4-methylhexyl)silicate, tetra-(p-tert-butylphenyl) silicate, hexyl-(4-methyl-2-pentoxy) disiloxane, poly(methyl) siloxanes, poly-(methylphenyl) siloxanes, etc.). Other synthetic lubricating oils include liquid esters of phosphorus-containing acids (e.g., tricresyl phosphate, trioctyl phosphate, diethyl ester of decanephosphonic acid, etc.), polymeric tetrahydrofurans and the like.

The oil can be a poly-alpha-olefin (PAO). Typically, the poly-alpha-olefins are derived from monomers having from about 4 to about 30, or from about 4 to about 20, or from about 6 to about 16 carbon atoms. Examples of useful PAOs include those derived from octene, decene, mixtures thereof, and the like. These PAOs may have a viscosity from about 2 to about 15, or from about 3 to about 12, or from about 4 to about 8 cSt at 100° C. Examples of useful PAOs include 4 cSt at 100° C. poly-alpha-olefins, 6 cSt at 100° C. poly-alpha-olefins, and mixtures thereof. Mixtures of mineral oil with the foregoing poly-alpha-olefins may be used.

Unrefined, refined and rerefined oils, either natural or synthetic (as well as mixtures of two or more of any of these) of the type disclosed hereinabove can be used in the lubricants of the present invention. Unrefined oils are those obtained directly from a natural or synthetic source without further purification treatment. For example, a shale oil obtained directly from retorting operations, a petroleum oil obtained directly from primary distillation or ester oil obtained directly from an esterification process and used without further treatment would be an unrefined oil. Refined oils are similar to the unrefined oils except they have been further treated in one or more purification steps to improve one or more properties. Many such purification techniques are known to those skilled in the art such as solvent extraction, secondary distillation, acid or base extraction, filtration, percolation, etc. Rerefined oils are obtained by processes similar to those used to obtain refined oils applied to refined oils which have been already used in service. Such rerefined oils are also known as reclaimed or reprocessed oils and often are additionally processed by techniques directed to removal of spent additives and oil breakdown products.

In one embodiment, the first lubricating oil composition further comprises an acylated nitrogen-containing compound having a substituent of at least about 10 aliphatic carbon atoms. These compounds typically function as ashless dispersants in lubricating oil compositions.

A number of acylated, nitrogen-containing compounds having a substituent of at least about 10 aliphatic carbon atoms and made by reacting a carboxylic acid acylating agent with an amino compound are known to those skilled in the art. In such compositions the acylating agent is linked to the amino compound through an imido, amido, amidine or salt linkage. The substituent of at least about 10 aliphatic carbon atoms may be in either the carboxylic acid acylating agent derived portion of the molecule or in the amino compound derived portion of the molecule. Preferably, however, it is in the acylating agent portion. The acylating agent can vary from formic acid and its acyl derivatives to acylating agents having high molecular weight aliphatic substituents of up to about 5,000, 10,000 or 20,000 carbon atoms. The amino compounds are characterized by the presence within their structure of at least one HN<group.

In one embodiment, the acylating agent is a mono- or polycarboxylic acid (or reactive equivalent thereof) such as a substituted succinic or propionic acid and the amino compound is a polyamine or mixture of polyamines, most typically, a mixture of ethylene polyamines. The amine also may be a hydroxyalkyl-substituted polyamine. The aliphatic substituent in such acylating agents typically averages at least about 30 or at least about 50 and up to about 400 carbon atoms.

Illustrative hydrocarbon based groups containing at least 10 carbon atoms are n-decyl, n-dodecyl, tetrapropylene, n-octadecyl, oleyl, chlorooctadecyl, triicontanyl, etc. Generally, the hydrocarbon-based substituents are made from homo- or interpolymers (e.g., copolymers, terpolymers) of mono- and di-olefins having 2 to 10 carbon atoms, such as ethylene, propylene, 1-butene, isobutene, butadiene, isoprene, 1-hexene, 1-octene, etc. Typically, these olefins are 1-monoolefins. The substituent can also be derived from the halogenated (e.g., chlorinated or brominated) analogs of such homo- or interpolymers. The substituent can, however, be made from other sources, such as monomeric high molecular weight alkenes (e.g., 1-tetracontene) and chlorinated analogs and hydrochlorinated analogs thereof, aliphatic petroleum fractions, particularly paraffin waxes and cracked and chlorinated analogs and hydrochlorinated analogs thereof, white oils, synthetic alkenes such as those produced by the Ziegler-Natta process (e.g., poly(ethylene) greases) and other sources known to those skilled in the art. Any unsaturation in the substituent may be reduced or eliminated by hydrogenation according to procedures known in the art.

The hydrocarbon-based substituents are substantially saturated, that is, they contain no more than one carbon-to-carbon unsaturated bond for every ten carbon-to-carbon single bonds present. Usually, they contain no more than one carbon-to-carbon non-aromatic unsaturated bond for every 50 carbon-to-carbon bonds present.

The hydrocarbon-based substituents are also substantially aliphatic in nature, that is, they contain no more than one non-aliphatic moiety (cycloalkyl, cycloalkenyl or aromatic) group of 6 or less carbon atoms for every 10 carbon atoms in the substituent. Usually, however, the substituents contain no more than one such non-aliphatic group for every 50 carbon atoms, and in many cases, they contain no such non-aliphatic groups at all; that is, the typical substituents are purely aliphatic. Typically, these purely aliphatic substituents are alkyl or alkenyl groups.

Specific examples of the substantially saturated hydrocarbon-based substituents containing an average of more than about 30 carbon atoms are the following:

a mixture of poly(ethylene/propylene) groups of about 35 to about 70 carbon atoms a mixture of the oxidatively or mechanically degraded poly(ethylene/propylene) groups of about 35 to about 70 carbon atoms a mixture of poly(propylene/1-hexene) groups of about 80 to about 150 carbon atoms a mixture of poly(isobutene) groups having an average of about 50 to about 200 carbon atoms A useful source of the substituents are poly(isobutene)s obtained by polymerization of a $C_4$ refinery stream having a butene content of about 35 to about 75 weight percent and isobutene content of about 30 to about 60 weight percent in the presence of a Lewis acid catalyst such as aluminum trichloride or boron trifluoride. These polybutenes contain predominantly (greater than 80% of total repeating units) isobutene repeating units of the configuration

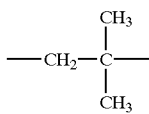

In one embodiment, the substituent is a polyisobutene group derived from a polyisobutene having a high methylvinylidene isomer content, that is, at least about 70% methylvinylidene, and in one embodiment at least about 80% methylvinylidene. Suitable high methylvinylidene polyisobutenes include those prepared using boron trifluoride catalysts. The preparation of such polyisobutenes in which the methylvinylidene isomer comprises a high percentage of the total olefin composition is described in U.S. Pat. Nos. 4,152,499 and 4,605,808, the disclosures of each of which are incorporated herein by reference.

In one embodiment, the carboxylic acid acylating agent is a hydrocarbon substituted succinic acid or anhydride. The substituted succinic acid or anhydride consists of hydrocarbon-based substituent groups and succinic groups wherein the substituent groups are derived from a polyalkene, said acid or anhydride being characterized by the presence within its structure of an average of at least about 0.9 succinic group for each equivalent weight of substituent groups, and in one embodiment about 0.9 to about 2.5 succinic groups for each equivalent weight of substituent groups. The polyalkene generally has an ($\overline{Mn}$) of at least about 700, and in one embodiment about 700 to about 2000, and in one embodiment about 900 to about 1800. The ratio between the weight average molecular weight ($\overline{Mw}$) and the ($\overline{Mn}$) (that is, the $\overline{Mw}/\overline{Mn}$) can range from about 1 to about 10, or about 1.5 to about 5. In one embodiment the polyalkene has an $\overline{Mw}/\overline{Mn}$ value of about 2.5 to about 5. For purposes of this invention, the number of equivalent weights of substituent groups is deemed to be the number corresponding to the quotient obtained by dividing the $\overline{Mn}$ value of the polyalkene from which the substituent is derived into the total weight of the substituent groups present in the substituted succinic acid. Thus, if a substituted succinic acid is characterized by a total weight of substituent group of 40,000 and the $\overline{Mn}$ value for the polyalkene from which the substituent groups are derived is 2000, then that substituted succinic acylating agent is characterized by a total of 20 (40,000/2000=20) equivalent weights of substituent groups.

In one embodiment the carboxylic acid acylating agent is a substituted succinic acid or anhydride, said substituted succinic acid or anhydride consisting of hydrocarbon-based substituent groups and succinic groups wherein the substituent groups are derived from polybutene in which at least about 50% of the total units derived from butenes is derived from isobutylene. The polybutene is characterized by an $\overline{Mn}$ value of about 1500 to about 2000 and an $\overline{Mw}/\overline{Mn}$ value of about 3 to about 4. These acids or anhydrides are characterized by the presence within their structure of an average of about 1.5 to about 2.5 succinic groups for each equivalent weight of substituent groups.

In one embodiment the carboxylic acid is at least one substituted succinic acid or anhydride, said substituted succinic acid or anhydride consisting of substituent groups and succinic groups wherein the substituent groups are derived from polybutene in which at least about 50% of the total units derived from butenes is derived from isobutylene. The polybutene has an $\overline{Mn}$ value of about 800 to about 1200 and an $\overline{Mw}/\overline{Mn}$ value of about 2 to about 3. The acids or anhydrides are characterized by the presence within their structure of an average of about 0.9 to about 1.2 succinic groups for each equivalent weight of substituent groups.

The amino compound is characterized by the presence within its structure of at least one HN<group and can be a monoamine or polyamine. Mixtures of two or more amino compounds can be used in the reaction with one or more acylating reagents. In one embodiment, the amino compound contains at least one primary amino group (i.e., —$NH_2$) and more preferably the amine is a polyamine, especially a polyamine containing at least two —NH— groups, either or both of which are primary or secondary amines. The amines may be aliphatic, cycloaliphatic, aromatic or heterocyclic amines.

Among the useful amines are the alkylene polyamines, including the polyalkylene polyamines. The alkylene polyamines include those conforming to the formula

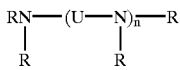

wherein n is from 1 to about 10; each R is independently a hydrogen atom, a hydrocarbyl group or a hydroxy-substituted or amine-substituted hydrocarbyl group having up to about 30 atoms, or two R groups on different nitrogen atoms can be joined together to form a U group, with the proviso that at least one R group is a hydrogen atom and U is an alkylene group of about 2 to about 10 carbon atoms. U may be ethylene or propylene. Alkylene polyamines where each R is hydrogen or an amino-substituted hydrocarbyl group with the ethylene polyamines and mixtures of ethylene polyamines are useful. Usually n will have an average value of from about 2 to about 7. Such alkylene polyamines include methylene polyamine, ethylene polyamines, propylene polyamines, butylene polyamines, pentylene polyamines, hexylene polyamines, heptylene polyamines, etc. The higher homologs of such amines and related amino alkyl-substituted piperazines are also included.

Alkylene polyamines that are useful include ethylene diamine, triethylene tetramine, propylene diamine, trimethylene diamine, hexamethylene diamine, decamethylene diamine, octamethylene diamine, di(heptamethylene) triamine, tripropylene tetramine, tetraethylene pentamine, trimethylene diamine, pentaethylene hexamine, di(trimethylene)triamine, N-(2-aminoethyl)piperazine, 1,4-bis(2-aminoethyl)piperazine, and the like. Higher homologs as are obtained by condensing two or more of the above-illustrated alkylene amines are useful, as are mixtures of two or more of any of the afore-described polyamines.

Ethylene polyamines, such as those mentioned above, are especially useful for reasons of cost and effectiveness. Such polyamines are described in detail under the heading "Diamines and Higher Amines" in The Encyclopedia of Chemical Technology, Second Edition, Kirk and Othmer, Volume 7, pages 27–39, Interscience Publishers, Division of John Wiley and Sons, 1965, which is hereby incorporated by reference for the disclosure of useful polyamines. Such compounds are prepared most conveniently by the reaction of an alkylene chloride with ammonia or by reaction of an ethylene imine with a ring-opening reagent such as ammonia, etc. These reactions result in the production of the somewhat complex mixtures of alkylene polyamines, including cyclic condensation products such as piperazines. These mixtures can be used.

Other useful types of polyamine mixtures are those resulting from stripping of the above-described polyamine mixtures. In this instance, lower molecular weight polyamines and volatile contaminants are removed from an alkylene polyamine mixture to leave as residue what is often termed "polyamine bottoms". In general, alkylene polyamine bottoms can be characterized as having less than two, usually less than 1% (by weight) material boiling below about 200° C. In the instance of ethylene polyamine bottoms, which are readily available and found to be quite useful, the bottoms contain less than about 2% (by weight) total diethylene triamine (DETA) or triethylene tetramine (TETA). A typical sample of such ethylene polyamine bottoms obtained from the Dow Chemical Company of Freeport, Texas designated "E-100" showed a specific gravity at 15.6° C. of 1.0168, a percent nitrogen by weight of 33.15 and a viscosity at 40° C. of 121 centistokes. Gas chromatography analysis of such a sample showed it to contain about 0.93% "Light Ends" (most probably DETA), 0.72% TETA, 21.74% tetraethylene pentamine and 76.61% pentaethylene hexamine and higher (by weight). These alkylene polyamine bottoms include cyclic condensation products such as piperazine and higher analogs of diethylenetriamine, triethylenetetramine and the like.

These alkylene polyamine bottoms can be reacted solely with the acylating agent, in which case the amino reactant consists essentially of alkylene polyamine bottoms, or they can be used with other amines and polyamines, or alcohols or mixtures thereof. In these latter cases at least one amino reactant comprises alkylene polyamine bottoms.

Other polyamines are described in, for example, U.S. Pat. Nos. 3,219,666 and 4,234,435, and these patents are hereby incorporated by reference for their disclosures of amines which can be reacted with the acylating agents described above to form useful acylated nitrogen-containing compounds.

In one embodiment, the amine may be a hydroxyamine. Typically, the hydroxyamines are primary, secondary or tertiary alkanol amines or mixtures thereof. Such amines can be represented by the formulae:

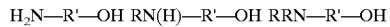

wherein each R is independently a hydrocarbyl group of one to about eight carbon atoms or hydroxyhydrocarbyl group of two to about eight carbon atoms, preferably one to about four, and R' is a divalent hydrocarbyl group of about two to about 18 carbon atoms, preferably two to about four. The group —R'—OH in such formulae represents the hydroxyhydrocarbyl group. R' can be an acyclic, alicyclic or aromatic group. Typically, R' is an acyclic straight or branched alkylene group such as an ethylene, 1,2-propylene, 1,2-butylene, 1,2-octadecylene, etc. group. Where two R groups are present in the same molecule they can be joined by a direct carbon-to-carbon bond or through a heteroatom (e.g., oxygen, nitrogen or sulfur) to form a 5-, 6-, 7- or 8-membered ring structure. Examples of such heterocyclic amines include N-(hydroxyl lower alkyl)-morpholines, -thiomorpholines, -piperidines, -oxazolidines, -thiazolidines and the like. Typically, however, each R'$_1$ is independently a methyl, ethyl, propyl, butyl, pentyl or hexyl group.

Examples of these alkanolamines include mono-, di-, and triethanol amine, diethylethanolamine, ethylethanolamine, butyldiethanolamine, etc.

The hydroxyamines can also be an ether N-(hydroxyhydrocarbyl)-amine. These are hydroxypoly (hydrocarbyloxy) analogs of the above-described hydroxy amines (these analogs also include hydroxyl-substituted oxyalkylene analogs). Such N-(hydroxyhydrocarbyl) amines can be conveniently prepared by reaction of epoxides with afore-described amines and can be represented by the formulae:

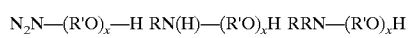

wherein x is a number from about 2 to about 15 and R and R' are as described above. R may also be a hydroxypoly (hydrocarbyloxy) group.

The acylated nitrogen-containing compounds include amine salts, amides, imides, amidines, amidic acids, amidic salts and imidazolines as well as mixtures thereof. To prepare the acylated nitrogen-containing compounds from the acylating reagents and the amino compounds, one or more acylating reagents and one or more amino compounds are heated, optionally in the presence of a normally liquid, substantially inert organic liquid solvent/diluent, at temperatures in the range of about 80° C. up to the decomposition point of either the reactants or the carboxylic derivative but normally at temperatures in the range of about 100° C. up to about 300° C. provided 300° C. does not exceed the decomposition point. Temperatures of about 125° C. to about 250° C. are normally used. The acylating reagent and the amino compound are reacted in amounts sufficient to provide from about one-half equivalent up to about 2 moles of amino compound per equivalent of acylating reagent.

Many patents have described useful acylated nitrogen-containing compounds including U.S. Pat. Nos. 3,172,892; 3,219,666; 3,272,746; 3,310,492; 3,341,542; 3,444,170; 3,455,831; 3,455,832; 3,576,743; 3,630,904; 3,632,511; 3,804,763; and 4,234,435. A typical acylated nitrogen-containing compound of this class is that made by reacting a poly(isobutene)-substituted succinic acid acylating agent (e.g., anhydride, acid, ester, etc.) wherein the poly (isobutene) substituent has between about 50 to about 400 carbon atoms with a mixture of ethylenepolyamines having about 3 to about 7 amino nitrogen atoms per ethylenepolyamine and about 1 to about 6 ethylene units. The above-noted U.S. patents are hereby incorporated by reference for their disclosure of acylated amino compounds and their method of preparation.

Another type of acylated nitrogen compound belonging to this class is that made by reacting a carboxylic acid acylating agent with a polyamine, wherein the polyamine is the product made by condensing a hydroxy material with an amine. These compounds are described in U.S. Pat. No. 5,053,152 which is incorporated herein by reference for its disclosure of such compounds.

Another type of acylated nitrogen compound belonging to this class is that made by reacting the afore-described alkyleneamines with the afore-described substituted succinic acids or anhydrides and aliphatic monocarboxylic acids having from 2 to about 22 carbon atoms. In these types of acylated nitrogen compounds, the mole ratio of succinic acid to monocarboxylic acid ranges from about 1:0.1 to about 1:1. Typical of the monocarboxylic acid are formic acid, acetic acid, dodecanoic acid, butanoic acid, oleic acid, stearic acid, the commercial mixture of stearic acid isomers known as isostearic acid, tall oil acid, etc. Such materials are more fully described in U.S. Pat. Nos. 3,216,936 and 3,250,715 which are hereby incorporated by reference for their disclosures in this regard.

Still another type of acylated nitrogen compound that may be useful is the product of the reaction of a fatty monocarboxylic acid of about 12–30 carbon atoms and the afore-described alkyleneamines, typically, ethylene-, propylene- or trimethylenepolyamines containing 2 to 8 amino groups and mixtures thereof. The fatty monocarboxylic acids are generally mixtures of straight and branched chain fatty carboxylic acids containing 12–30 carbon atoms. A widely used type of acylated nitrogen compound is made by reacting the afore-described alkylenepolyamines with a mixture of fatty acids having from 5 to about 30 mole percent straight chain acid and about 70 to about 95% mole branched chain fatty acids. Among the commercially available mixtures are those known widely in the trade as isostearic acid. These mixtures are produced as a by-product from the dimerization of unsaturated fatty acids as described in U.S. Pat. Nos. 2,812,342 and 3,260,671.

The branched chain fatty acids can also include those in which the branch is not alkyl in nature, such as found in phenyl and cyclohexyl stearic acid and the chloro-stearic acids. Branched chain fatty carboxylic acid/alkylene polyamine products have been described extensively in the art. See for example, U.S. Pat. Nos. 3,110,673; 3,251,853; 3,326,801; 3,337,459; 3,405,064; 3,429,674; 3,468,639; 3,857,791. These patents are hereby incorporated by reference for their disclosure of fatty acid/polyamine condensates for use in lubricating oil formulations.

In one embodiment, the first lubricating oil composition is characterized by a chlorine level of no more than about 10 ppm. This necessitates that the acylated nitrogen-containing ashless dispersants be chlorine-free or contain such low chlorine levels that the addition of such dispersants to the first lubricating oil composition results in the formation of lubricating oil composition with a chlorine level of no more than about 10 ppm. In one embodiment, the acylated nitrogen containing dispersant has a chlorine content of no more than about 50 ppm, and in one embodiment no more than about 25 ppm, and in one embodiment no more than about 10 ppm. In one embodiment, the acylated nitrogen-containing dispersant is chlorine free.

The acylated nitrogen-containing ashless dispersants are typically employed in the first lubricating oil composition at a concentration in the range of about 1% to about 25% percent by weight, and in one embodiment about 5% to about 15% by weight. These dispersants can be added directly to the lubricating oil composition. In one embodiment, however, they are diluted with a substantially inert, normally liquid organic diluent such as mineral oil, naphtha, benzene, toluene or xylene to form an additive concentrate. These concentrates usually contain from about 1% to about 99% by weight, and in one embodiment about 10% to about 90% by weight of the diluent.

As indicated above, when the first lubricating oil composition is a non-consumable oil, optionally it may contain a minor amount of one or more EP additives comprised of a metal and phosphorus, provided that the amount of phosphorus contributed to the first lubricating oil composition by this additive does not exceed about 0.04% by weight of the first lubricating composition. In one embodiment, the phosphorus content does not exceed about 0.035% by weight, and in one embodiment about 0.03% by weight, and in one embodiment about 0.025% by weight, and in one embodiment about 0.02% by weight, and in one embodiment about 0.015% by weight, and in one embodiment the phosphorus content does not exceed about 0.01% by weight. The phosphorus-containing acids useful in making these EP additives may be represented by the formula

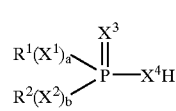

(A)

wherein in Formula (A): $X^1$, $X^2$, $X^3$ and $X^4$ are independently oxygen or sulfur, a and b are independently zero or one, $R^1$, $R^2$ and $R^3$ are independently hydrocarbyl groups, and $R^3$ can be hydrogen. Illustrative examples include: dihydrocarbyl phosphinodithioic acids, S-hydrocarbyl hydrocarbyl phosphonotrithioic acids, O-hydrocarbyl hydrocarbyl phosphonodithioic acids, S,S-dihydrocarbyl phosphorotetrathioic acids, O,S-dihydrocarbyl phosphorotrithioic acids, O,O-dihydrocarbyl phosphorodithioic acids, and the like.

Useful phosphorus-containing acids are phosphorus- and sulfur-containing acids. These include those acids wherein in Formula (A) at least one $X^3$ or $X^4$ is sulfur, and in one embodiment both $X^3$ and $X^4$ are sulfur, at least one $X^1$ or $X^2$ is oxygen or sulfur, and in one embodiment both $X^1$ and $X^2$ are oxygen, and a and b are each 1. Mixtures of these acids may be employed in accordance with this invention.

$R^1$ and $R^2$ in Formula (A) are independently hydrocarbyl groups that are preferably free from acetylenic unsaturation and usually also from ethylenic unsaturation and in one embodiment have from about 1 to about 50 carbon atoms, and in one embodiment from about 1 to about 30 carbon atoms, and in one embodiment from about 3 to about 18 carbon atoms, and in one embodiment from about 3 to about 8 carbon atoms. Each $R^1$ and $R^2$ can be the same as the other, although they may be different and either or both may be mixtures. Examples of $R^1$ and $R^2$ groups include isopropyl, n-butyl, isobutyl, amyl, 4-methyl-2-pentyl, isooctyl, decyl, dodecyl, tetradecyl, 2-pentenyl, dodecenyl, phenyl, naphthyl, alkylphenyl, alkylnaphthyl, phenylalkyl, naphthylalkyl, alkylphenylalkyl, alkylnaphthylalkyl, and mixtures thereof. Particular examples of useful mixtures include, for example, isopropyl/n-butyl; isopropyl/secondary butyl; isopropyl/4-methyl-2-pentyl; isopropyl/2-ethyl-1-hexyl; isopropyl/isooctyl; isopropyl/decyl; isopropyl/dodecyl; and isopropyl/tridecyl.

$R^3$ in Formula (A) can be hydrogen or a hydrocarbyl group (e.g., alkyl) of 1 to about 12 carbon atoms, and in one embodiment 1 to about 4 carbon atoms.

The preparation of the metal salts of the phosphorus-containing acids may be effected by reaction with the metal or metal oxide. Simply mixing and heating these two reactants is sufficient to cause the reaction to take place and the resulting product is sufficiently pure for the purposes of this invention. Typically the formation of the salt is carried out in the presence of a diluent such as an alcohol, water or diluent oil. Neutral salts are prepared by reacting one equivalent of metal oxide or hydroxide with one equivalent of the acid. Basic metal salts are prepared by adding an excess of (more than one equivalent) the metal oxide or hydroxide to one equivalent of phosphorodithioic acid.

The metal salts of the phosphorus-containing acids represented by Formula (A) which are useful include those salts containing Group IA, IIA or IIB metals, aluminum, lead, tin, iron, molybdenum, manganese, cobalt, nickel or bismuth. Zinc is a useful metal. These salts can be neutral salts or basic salts. Examples of useful metal salts of phosphorus-containing acids, and methods for preparing such salts are found in the prior art such as U.S. Pat. Nos. 4,263,150; 4,289,635; 4,308,154; 4,322,479; 4,417,990; and 4,466,895, and the disclosures of these patents are hereby incorporated by reference. These salts include the Group II metal phosphorodithioates such as zinc dicyclohexylphosphorodithioate, zinc dioctylphosphorodithioate, barium di(heptylphenyl)-phosphorodithioate, cadmium dinonylphosphorodithioate, and the zinc salt of a phosphorodithioic acid produced by the reaction of phosphorus pentasulfide with an equimolar mixture of isopropyl alcohol and n-hexyl alcohol.

When the first lubricating oil composition is used as a non-consumable oil it may contain one or more detergents or dispersants of the ash-producing type. The ash-producing detergents are exemplified by oil-soluble neutral and basic salts of alkali or alkaline earth metals with sulfonic acids, carboxylic acids, or organic phosphorus acids characterized by at least one direct carbon-to-phosphorus linkage such as those prepared by the treatment of an olefin polymer (e.g., polyisobutene having a molecular weight of 1000) with a phosphorizing agent such as phosphorus trichloride, phosphorus heptasulfide, phosphorus pentasulfide, phosphorus trichloride and sulfur, white phosphorus and a sulfur halide, or phosphorothioic chloride. The most commonly used salts of such acids are those of sodium, potassium, lithium, calcium, magnesium, strontium and barium. The concentration of ash-producing detergent or dispersant in the first lubricating oil composition may be in the range that is sufficient to provide an ash content of up to about 2% as measured by the test procedure in ASTM D874-96, and in one embodiment up to about 1.5% ash, and in one embodiment up to about 1% ash, and in one embodiment up to about 0.6% ash.

The first lubricating oil composition may also contain other lubricant additives known in the art. These include, for example, corrosion-inhibiting agents, antioxidants, viscosity modifiers, pour point depressants, friction modifiers, fluidity modifiers, anti-foam agents, etc.

Pour point depressants are used to improve the low temperature properties of oil-based compositions. See, for example, page 8 of "Lubricant Additives" by C. V. Smalheer and R. Kennedy Smith (Lezius Hiles Co. publishers, Cleveland, Ohio, 1967). Examples of useful pour point depressants are polymethacrylates; polyacrylates; polyacrylamides; condensation products of haloparaffin waxes and aromatic compounds; vinyl carboxylate polymers; and terpolymers of dialkylfumarates, vinyl esters of fatty acids and alkyl vinyl ethers. Pour point depressants are described in U.S. Pat. Nos. 2,387,501; 2,015,748; 2,655,479; 1,815,022; 2,191,498; 2,666,746; 2,721,877; 2,721,878; and 3,250,715 which are herein incorporated by reference for their relevant disclosures.

Anti-foam agents are used to reduce or prevent the formation of stable foam. Typical anti-foam agents include silicones or organic polymers. Additional antifoam compositions are described in "Foam Control Agents," by Henry T. Kerner (Noyes Data Corporation, 1976), pages 125–162.

Each of the foregoing additives, when used, is used at a functionally effective amount to impart the desired properties to the lubricant. Thus, for example, if an additive is a corrosion inhibitor, a functionally effective amount of this corrosion inhibitor would be an amount sufficient to impart the desired corrosion inhibition characteristics to the lubricant. Generally, the concentration of each of these additives, when used, ranges from about 0.001% to about 20% by weight, and in one embodiment about 0.01% to about 10% by weight based on the total weight of the lubricant.

These additives can be added directly to the lubricant. In one embodiment, however, they are diluted with a substantially inert, normally liquid organic diluent such as mineral oil, naphtha, benzene, toluene or xylene to form an additive concentrate. These concentrates usually contain from about 1% to about 99% by weight, and in one embodiment about 10% to about 90% by weight of such diluent.

The Second Lubricating Oil Composition

The second lubricating oil composition is used to lubricate the valve train section 14 of the engine 10 (FIG. 1) or 10A (FIG. 2). The second lubricating oil composition may also be used in accordance with the inventive method as a functional fluid for performing additional functions. Thus, the second lubricating oil composition may also be used as an automatic transmission fluid, gear lubricant, hydraulic fluid, power steering fluid, and the like.

The second lubricating oil composition typically has a viscosity of about 4 to about 20 cSt at 100° C., and in one embodiment about 6 to about 16 cSt at 100° C., and in one embodiment about 8 to about 13 cSt at 100° C. These compositions may have an SAE viscosity grade of 0W, 0W-20, 0W-30, 0W-40, 0W-50, 0W-60, 5W, 5W-20, 5W-30, 5W-40, 5W-50, 5W-60, 10W, 10W-20, 10W-30, 10W-40 or 10W-50.

The base oil for the second lubricating oil composition can be any natural or synthetic oil, or mixture thereof as described above. The base oil is present in the second lubricating oil composition in a major amount (i.e. an amount greater than about 50% by weight). Generally, the base oil is present in an amount greater than about 60%, or greater than about 70%, or greater than about 80% by weight of the second lubricating oil composition.

The second lubricating oil composition may contain known additives for controlling its properties and characteristics. Such additives include, for example, detergents and dispersants, corrosion-inhibiting agents, antioxidants, viscosity improving agents, EP agents, pour point depressants, friction modifiers, fluidity modifiers, anti-foam agents, etc.

The second lubricating oil composition may contain one or more detergents or dispersants of the ash-producing or ashless type. The ash-producing detergents and dispersants that are useful are described above.

Ashless detergents and dispersants are so called despite the fact that, depending on its constitution, the dispersant may upon combustion yield a non-volatile material such as boric oxide or phosphorus pentoxide; however, it does not ordinarily contain metal and therefore does not yield a metal-containing ash on combustion. Many types are known in the art, and are suitable for use in the second lubricating oil compositions of this invention. These include the acylated nitrogen-containing ashless dispersants discussed above. Also included are the following:

(1) Reaction products of carboxylic acids (or derivatives thereof) containing at least about 34, and in one embodiment at least about 54 carbon atoms, with organic hydroxy compounds such as phenols and alcohols, and/or basic inorganic materials. Examples of these "carboxylic dispersants" are described in many U.S. Pat. Nos. including 3,219,666; 4,234,435; and 4,938,881.

(2) Reaction products of relatively high molecular weight aliphatic or alicyclic halides with amines, preferably oxyalkylene polyamines. These may be characterized as "amine dispersants" and examples thereof are described for example, in the following U.S. Pat. Nos.: 3,275,554; 3,438,757; 3,454,555; and 3,565,804.

(3) Reaction products of alkyl phenols in which the alkyl group contains at least about 30 carbon atoms with aldehydes (especially formaldehyde) and amines (especially polyalkylene polyamines), which may be characterized as "Mannich dispersants." The materials described in the following U.S. Pat. Nos. are illustrative: 3,649,229; 3,697,574; 3,725,277; 3,725,480; 3,726,882; and 3,980,569.

(4) Products obtained by post-treating the amine or Mannich dispersants with such reagents as urea, thiourea, carbon disulfide, aldehydes, ketones, carboxylic acids, hydrocarbon-substituted succinic anhydrides, nitrites, epoxides, boron compounds, phosphorus compounds or the like. Exemplary materials of this kind are described in the following U.S. Pat. Nos. 3,639,242; 3,649,229; 3,649,659; 3,658,836; 3,697,574; 3,702,757; 3,703,536; 3,704,308; and 3,708,422.

5) Interpolymers of oil-solubilizing monomers such as decyl methacrylate, vinyl decyl ether and high molecular weight olefins with monomers containing polar substituents, e.g., aminoalkyl acrylates or acrylamides and poly-(oxyethylene)-substituted acrylates. These may be characterized as "polymeric dispersants" and examples thereof are disclosed in the following U.S. Pat. Nos.: 3,329,658; 3,449,250; 3,519,565; 3,666,730; 3,687,849; and 3,702,300.

The above-noted patents are incorporated by reference herein for their disclosures of ashless dispersants.

The second lubricating oil composition may contain one or more EP agents, corrosion inhibitors and/or oxidation inhibitors. EP agents and corrosion- and oxidation-inhibiting agents which may be included in the second lubricating composition of the invention are exemplified by chlorinated aliphatic hydrocarbons such as chlorinated wax; organic sulfides and polysulfides such as benzyl disulfide, bis (chlorobenzyl)disulfide, dibutyl tetrasulfide, sulfurized methyl ester of oleic acid, sulfurized alkylphenol, sulfurized dipentene, and sulfurized terpene; phosphosulfurized hydrocarbons such as the reaction product of a phosphorus sulfide with turpentine or methyl oleate; metal thiocarbamates, such as zinc dioctyldithiocarbamate, and barium heptylphenyl dithiocarbamate; dithiocarbamate esters from the reaction product of dithiocarbamic acid and acrylic, methacrylic, maleic, fumaric or itaconic esters; dithiocarbamate containing amides prepared from dithiocarbamic acid and an acrylamide; alkylene-coupled dithiocarbamates; sulfur-coupled dithiocarbamates; metal (e.g., zinc) dialkyl dithiophosphates; etc. The EP agents that are useful include the EP agents comprised of metal and phosphorus described above. Many of the above-mentioned EP agents and oxidation-inhibitors also serve as antiwear agents.

Pour point depressants and antifoam agents such as those discussed above may be used.

Each of the foregoing additives, when used, is used at a functionally effective amount to impart the desired properties to the second lubricating oil composition. Thus, for example, if an additive is a dispersant, a functionally effective amount of this dispersant would be an amount sufficient to impart the desired dispersancy characteristics to the second lubricating oil composition. Similarly, if the additive is an EP agent, a functionally effective amount of the EP agent would be a sufficient amount to improve the EP characteristics of the second lubricating oil composition. Generally, the concentration of each of these additives, when used, ranges from about 0.001% to about 20% by weight, and in one embodiment about 0.01% to about 10% by weight based on the total weight of the lubricating composition.

The above-discussed additives can be added directly to the second lubricating oil composition. In one embodiment, however, they are diluted with a substantially inert, normally liquid organic diluent such as mineral oil, naphtha, benzene, toluene or xylene to form an additive concentrate. These concentrates usually contain from about 1% to about 99% by weight, and in one embodiment about 10% to about 90% by weight of such diluent.

EXAMPLE 1

An engine test is conducted using a 2.3 liter, overhead cam, four-cylinder Ford electronic fuel injected engine. The engine is operated at low- and mid-range speeds and temperatures for 288 hours, simulating stop-and-go urban and moderate freeway driving. The test conditions involve 72 cycles, each being 4 hours in length and having 3 stages, for a total test time of 288 hours. The length of time and operating conditions for each stage is as follows:

| Stage | Hours | Speed (ppm) | Load (kW) | Oil (° C.) | Coolant (° C.) |
|---|---|---|---|---|---|
| 1 | 2.00 | 2500 | 25.0 | 68.3 | 51.7 |
| 2 | 1.25 | 2500 | 25.0 | 98.9 | 85.0 |
| 3 | 0.75 | 750 | 0.7 | 46.1 | 46.1 |

The valve train (i.e, cam shaft, valve lifters, rocker arms, valve stems, etc.) is separated from the crankcase (i.e., crankshaft, pistons, connecting rods, etc.) to simulate a split engine design. The standard Cu—Pb bearings are replaced with Al—Sn bearings. A Johnson Matthey supplied catalyst is installed in the exhaust system.

The fuel is a conventional low-sulfur, unleaded gasoline fuel composition. The valve train is lubricated using a conventional lubricating oil composition. The crankcase is lubricated with the following lubricating oil composition (in the table below all numerical values provided for the components of the composition (except the foam inhibitor) are in parts by weight).

| | |
|---|---|
| Base oil--SAE 5W-30 Polyalpha olefin oil mixture (80% by wt. polyalphaolefin having viscosity of 6 cSt @ 100° C. and 20% by wt. polyalphaolefin having viscosity of 4 cSt 100° C.) | 83.4 |
| Dispersant--Succinimide derived from high vinylidene polyisobutene (Mn = 1000) substituted succinic anhydride and tetraethylene pentamine (Nitrogen content = 3.3% by wt.) dispersed in oil (40% by wt. diluent oil) | 14.3 |
| Viscosity modifier--LZ 7067 (a product of Lubrizol identified as an olefin copolymer) | 0.8 |
| Diluent oil (100N mineral oil) | 0.38 |
| Corrosion inhibitor--Pluradyne FL11 (product of BASF identified as an ethylene oxide-propylene oxide copolymer) | 0.02 |
| Antioxidant--Nonylated diphenylamine | 0.6 |
| Antioxidant--4,4'-methylene bis 2,6-di-t-butyl phenol | 0.5 |
| Foam inhibitor--Polydimethyl siloxane dispersed in kerosene (90% kerosene) | 50 ppm |
| Physical properties: | |
| Viscosity @ 100° C., cSt | 11.59 |
| Viscosity @ 40° C., cSt | 70.71 |
| Viscosity index | 159 |
| High Temperature/High Sheer @ 150° C., cP (ASTM D 4683) | 3.46 |
| Chemical properties: | |
| % S, P, Zn, Si, Ca, Mg, Na, Halogen | nil |
| % N, wt % | 0.492 |
| % Si, ppm | 2 |

The gasoline fuel composition contains 0.5% by weight of a freshly blended sample of the foregoing lubricating oil composition. Oil is removed from the crankcase in quantities equivalent to the oil consumed with the fuel. The fuel usage per 24 hour interval is 110 liters. At 24 hour intervals, 0.71 liter samples of crankcase oil are removed, and replaced with 0.54 liter of new oil plus 0.17 liter of the removed sample.

Figure 3:
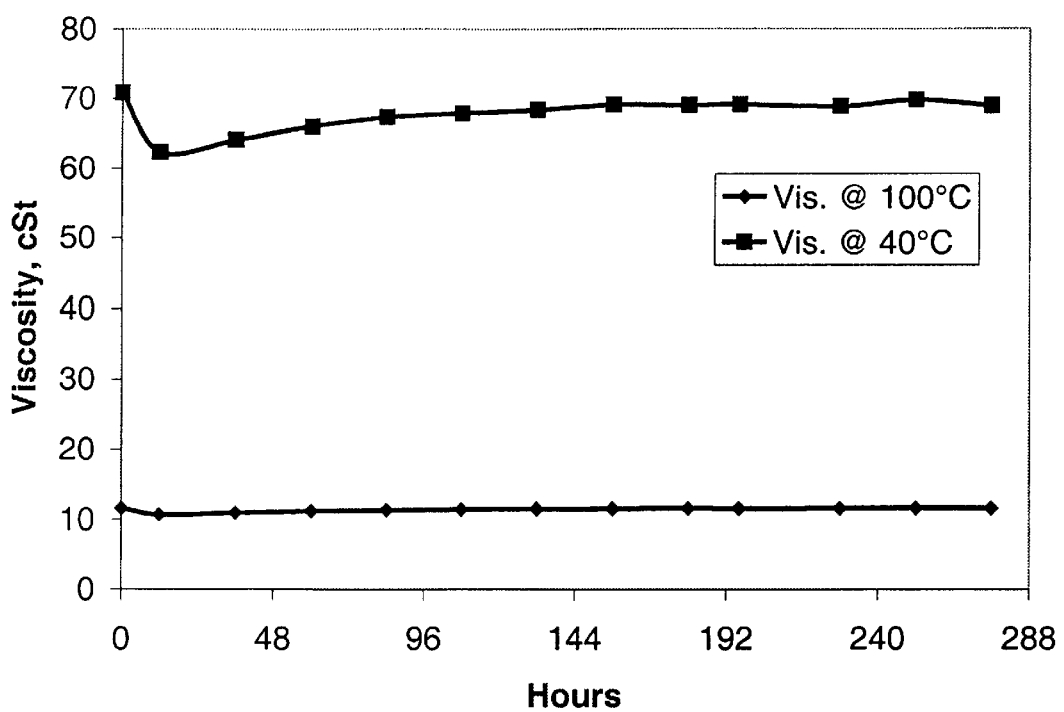
FIG. 3 is a plot of the viscosity of the crankcase oil observed during the engine test reported in Example 1.

A plot of the viscosity of the crankcase oil during the test is provided in FIG. 3. These results indicate that the viscosity is stable after an initial shearing of the polymer.

Figure 4:
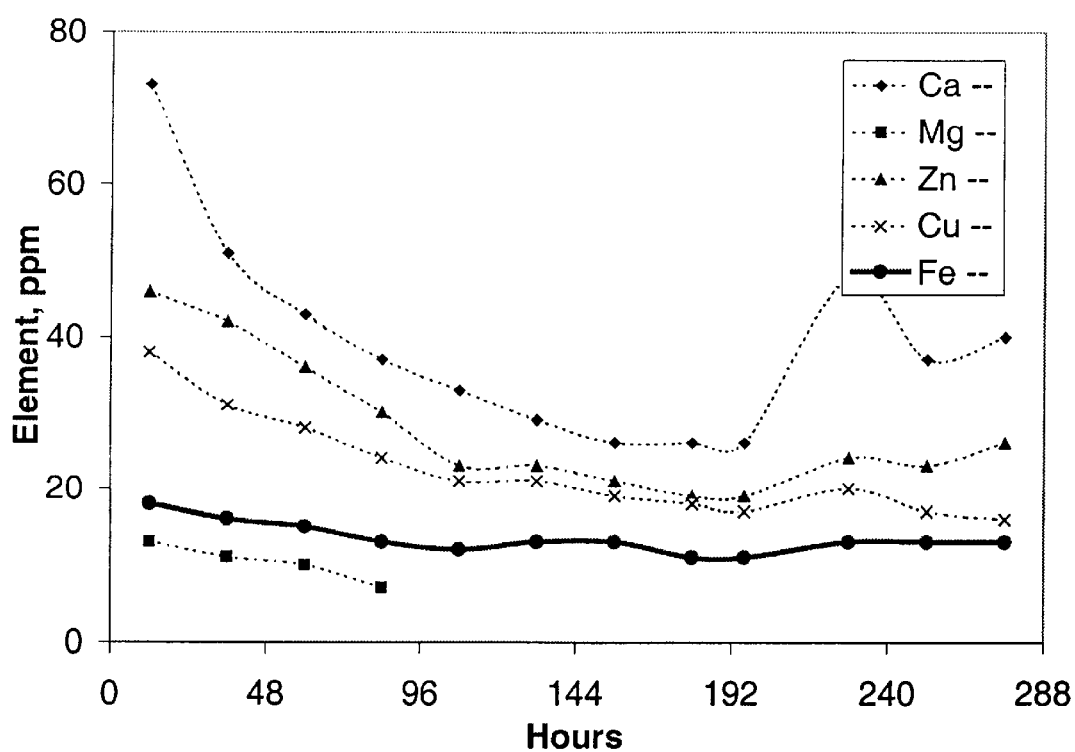
FIG. 4 is a plot of the metals analyses of the crankcase oil observed during the engine test reported in Example 1.

A plot of the metals analysis of the crankcase oil during the test is provided in FIG. 4. These results indicate a low level of lubricant metals are detected in the crankcase oil. The iron level is about 13 ppm which is very low, suggesting low wear. No chromium or molybdenum from the rings is detected.

Figure 5:
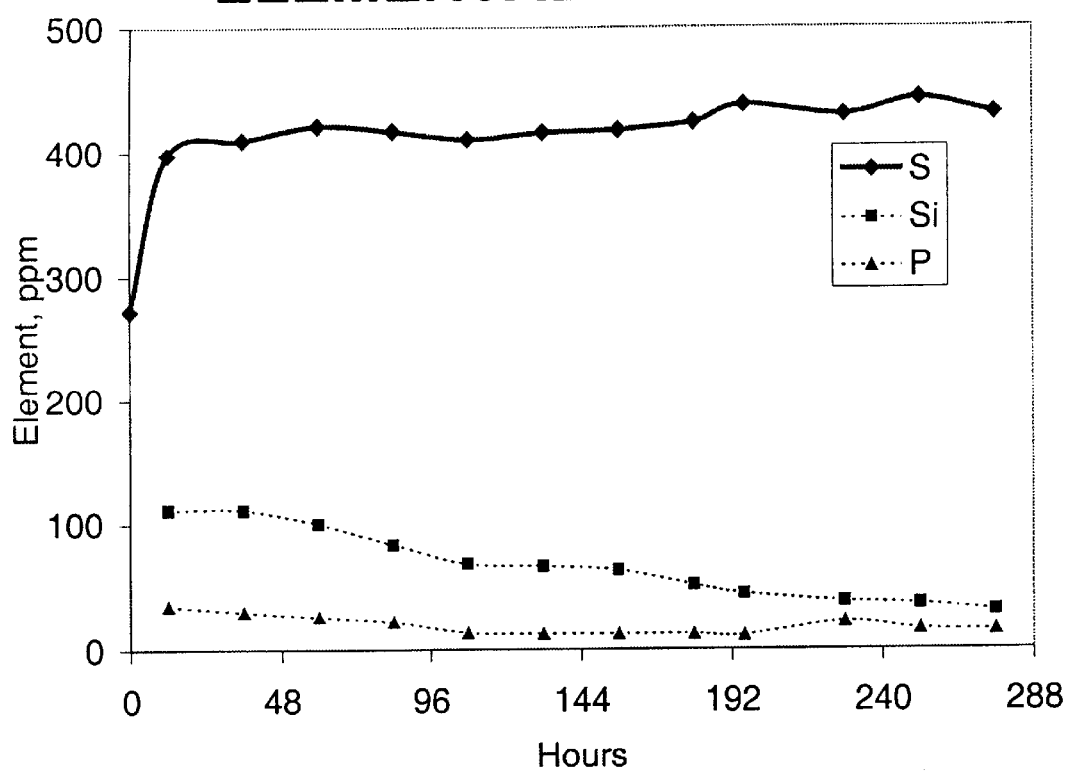
FIG. 5 is a plot of the elemental analyses of the crankcase oil observed during the engine test reported in Example 1.
Figure 6:
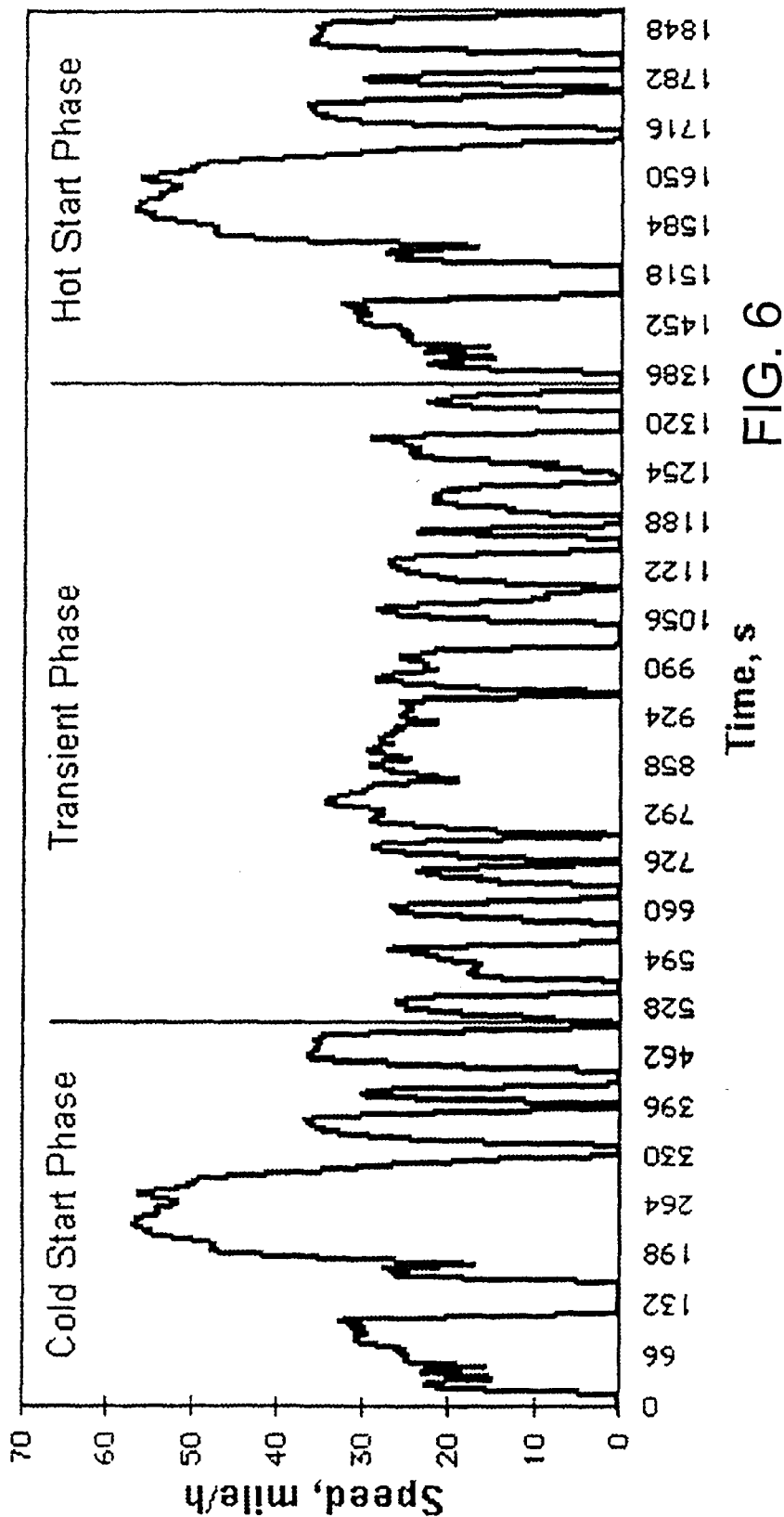
FIG. 6 is a plot showing the 1975 FTP (federal test procedure)US City Cycle driving sequence used in Example 2.

Elemental analysis of the crankcase oil during the test is provided in FIG. 5. The relatively high level of sulfur is believed to result from sulfur in the diluent oil used with the oil additives. The relatively high silicon level is believed to be from the sealants used in the assembly of the engine. The trailing off of the Si level during the test suggests it is not a continuing contaminant.

EXAMPLE 2

An emissions comparison test is performed using a ULEV Honda equipped with a catalytic converter using the 1975 FTP (federal test procedure) US City Cycle driving sequence indicated in FIG. 7. The test procedure is described in the Code of Federal Regulations, Title 40, Part 86, Subpart B. The engine is lubricated with a conventional lubricating oil composition. A baseline is established by initially operating the engine using a conventional gasoline fuel composition. The test is then repeated using a mixture of the lubricating oil composition indicated below with the gasoline fuel composition, the concentration of the oil composition in the fuel-oil mixture being 1% by weight. In the table below all numerical values provided for the components of the composition are in parts by weight.

| | |
|---|---|
| Base oil--SAE 5W-20 100N mineral oil having a viscosity of 21.50 cSt at 40° C. and 4.41 cSt at 100° C., a sulfur content of 0.0010% by weight, a nitrogen content of 0.0002% by weight, and a hydrocarbon content that is 100% saturates. | 81.7 |
| Dispersant--Succinimide derived from polyisobutene (Mn = 1000) substituted succinic anhydride and polyethylene amines (Nitrogen content = 0.97% by wt.; chlorine content = 0% by wt.) dispersed in oil (40% by wt. diluent oil) | 16.67 |
| Viscosity modifier--Styrene-maleic anhydride copolymer dispersed in oil (53.6% by wt. diluent oil) | 0.3 |
| Diluent oil | 0.13 |
| Corrosion inhibitor--Pluradyne FL11 (product of BASF identified as an ethylene oxide-propylene oxide copolymer) | 0.02 |
| Antioxidant--Nonylated diphenylamine | 0.6 |
| Antioxidant--4,4'-methylene bis 2,6-di-t-butyl phenol | 0.5 |
| Physical properties: | |
| Viscosity @ 100° C., cSt | 6.90 |
| Viscosity @ 40° C., cSt | 38.66 |
| Viscosity index | 139 |
| High Temperature/High Sheer @ 150° C., cP (ASTM D4683) | 2.37 |
| Chemical properties: | |
| % S, P, Zn, Si, Ca, Mg, Na, Halogen | nil |
| % N, wt % | 0.181 |

Test samples of the exhaust gas are taken upstream of the catalytic converter (Pre-Catalyst) and downstream of the catalytic converter (Tail Pipe) during the cold start phase, transient phase and hot start phase of the drive cycle. The statistically significant differentials measurements in grams of pollutants per mile between the gasoline baseline and the fuel-oil test mixture are indicated below.

| | Cold Start | Transient | Hot Start | Weighted Average Composite |
|---|---|---|---|---|
| Pre-Catalyst | | | | |
| HC | 0.389 | 0.52 | 0.398 | 0.46 |
| CO | * | * | −0.644 | * |
| $NO_x$ | * | * | * | * |
| $CO_2$ | * | * | * | * |

-continued

| | Cold Start | Transient | Hot Start | Weighted Average Composite |
|---|---|---|---|---|
| Tail Pipe | | | | |
| HC | 0.033 | * | * | 0.007 |
| CO | * | * | * | * |
| $NO_x$ | * | * | * | * |
| $CO_2$ | * | * | * | * |
| Fuel Cons | * | * | * | * |
| Particulate | * | * | * | * |

*Differential is not statistically significant.

These results indicate that while the hydrocarbon (HC) emissions out of the engine are significantly higher when the fuel-oil mixture is used, they are not significantly higher at the tail pipe when an effective catalytic converter is used to treat the emissions.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A method of operating a spark ignition four-stroke internal combustion engine comprised of a valve train and a crankcase and equipped with an exhaust gas aftertreatment device, said method comprising:
   (A) operating said engine using a gasoline fuel composition, the exhaust gas from the operation of said engine being advanced through said aftertreatment device;
   (B) lubricating said crankcase using a first lubricating oil composition, said first lubricating oil composition being characterized by the absence of extreme-pressure additives comprised of metal and phosphorus;
   (C) lubricating said valve train using a second lubricating oil composition;
   (D) removing part of said first lubricating oil composition from said crankcase, said removed part of said first lubricating oil composition (i) being combined with said gasoline fuel composition and consumed with said gasoline fuel composition as said engine is operated or (ii) being combined with the exhaust gas from said engine and removed from said engine with said exhaust gas; and
   (E) adding an additional amount of said first lubricating oil composition to said crankcase to replace said removed part of said first lubricating oil composition.

2. The method of claim 1 wherein the combination of gasoline fuel composition and first lubricating oil composition formed in step (D) is comprised of about 0.01% to about 5% by weight of said first lubricating oil composition.

3. The method of claim 1 wherein said gasoline fuel composition is an unleaded fuel.

4. The method of claim 1 wherein said gasoline fuel composition has a sulfur content of up to about 300 ppm.

5. The method of claim 1 wherein said gasoline fuel composition has a chlorine content of no more than about 10 ppm.

6. The method of claim 1 wherein said first lubricating oil composition is comprised of components that add only C, H, O or N, and optionally Si to said composition.

7. The method of claim 1 wherein said first lubricating oil composition has a viscosity of up to about 15 cSt at 100° C.

8. The method of claim 1 wherein said first lubricating oil composition has an SAE Viscosity Grade of 0W, 0W-20, 0W-30, 0W-40, 0W-50, 0W-60, 5W, 5W-20, 5W-30, 5W-40, 5W-50, 5W-60, 10W, 10W-20, 10W-30, 10W-40 or 10W-50.

9. The composition of claim 1 wherein said first lubricating oil composition has a high-temperature/high-shear viscosity at 150° C. of up to about 5 centipoise.

10. The method of claim 1 wherein said first lubricating oil composition is comprised of a mineral base oil.

11. The method of claim 1 wherein said first lubricating oil composition is comprised of a poly-alpha-olefin base oil.

12. The method of claim 1 wherein said first lubricating oil composition is comprised of an acylated nitrogen-containing compound having a substituent of at least about 10 aliphatic carbon atoms.

13. The method of claim 12 wherein said acylated nitrogen-containing compound is derived from a carboxylic acylating agent and at least one amino compound containing at least one —NH— group, said acylating agent being linked to said amino compound through an imido, amido, amidine or salt linkage.

14. The method of claim 13 wherein said amino compound is an alkylenepolyamine represented by the formula:

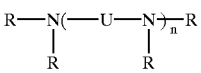

wherein U is an alkylene group of from about 2 to about 10 carbon atoms; each R is independently a hydrogen atom, a hydrocarbyl group, a hydroxy-substituted hydrocarbyl group, or an amine-substituted hydrocarbyl group containing up to about 30 carbon atoms, with the proviso that at least one R is a hydrogen atom; and n is 1 to about 10.

15. The method of claim 13 wherein said amino compound is an alkylenepolyamine of 2 to about 8 amino groups.

16. The method of claim 13 wherein said carboxylic acylating agent is a mono- or polycarboxylic acid or anhydride containing an aliphatic hydrocarbyl substituent of at least about 30 carbon atoms.

17. The method of claim 12 wherein said acylated nitrogen-containing compound is a polyisobutene substituted succinimide containing at least about 50 aliphatic carbon atoms in the polyisobutene group.

18. The method of claim 1 wherein said first lubricating oil composition is characterized by the absence of an extreme-pressure additive comprised of metal and phosphorus.

19. The method of claim 1 wherein said first lubricating oil composition is characterized by the absence of an ash-producing detergent or dispersant.

20. The method of claim 1 wherein said first lubricating oil composition is comprised of at least one corrosion-inhibiting agent, antioxidant, viscosity modifier, pour point depressant, friction modifier, fluidity modifier, or anti-foam agent.

21. The method of claim 1 wherein said second lubricating oil composition has a viscosity of about 4 to about 20 cSt at 100° C.

22. The method of claim 1 wherein said second lubricating oil composition has an SAE Viscosity Grade of 0W, 0W-20, 0W-30, 0W-40, 0W-50, 0W-60, 5W, 5W-20, 5W-30, 5W-40, 5W-50, 5W-60, 10W, 10W-20, 10W-30, 10W-40 or 10W-50.

23. The method of claim 1 wherein said second lubricating oil composition is comprised of a mineral base oil.

24. The method of claim 1 wherein said second lubricating oil composition is comprised of a synthetic base oil.

25. The method of claim 1 wherein said second lubricating oil composition is comprised of an acylated nitrogen-containing compound having a substituent of at least about 10 aliphatic carbon atoms.

26. The method of claim 1 wherein said second lubricating oil composition is comprised of at least one detergent, dispersant, corrosion-inhibiting agent, antioxidant, viscosity improving agent, EP agent, pour point depressant, friction modifier, fluidity modifier, or anti-foam agent.

27. The method of claim 1 wherein during step (D) said removed part of said first lubricating oil composition is introduced into said fuel composition in the fuel tank, fuel return line, fuel injectors, fuel valve guides, intake manifold, positive crankcase ventilation system, exhaust gas recirculation system, or air intake system of the fuel engine.

28. A method of operating a spark ignition four-stroke internal combustion engine comprised of a valve train and a crankcase and equipped with an exhaust gas aftertreatment device, said method comprising:
  (A) operating said engine using a gasoline fuel composition, the exhaust gas from the operation of said engine being advanced through said aftertreatment device;
  (B) lubricating said crankcase using a first lubricating oil composition;
  (C) lubricating said valve train using a second lubricating oil composition;
  (D) removing part of said first lubricating oil composition from said crankcase, said removed part of said first lubricating oil composition being combined with said exhaust gas upstream of said exhaust gas aftertreatment device, said first lubricating oil composition being characterized by the absence of extreme-pressure additives comprised of metal and phosphorus; and
  (E) adding and additional amount of said first lubricant oil composition to said crankcase to replace said removed part of said first lubricating oil composition.

29. A method of operating a spark ignition four-stroke internal combustion engine comprised of a valve train and a crankcase and equipped with an exhaust gas aftertreatment device, said method comprising:
  (A) operating said engine using a gasoline fuel composition, the exhaust gas from the operation of said engine being advanced through said aftertreatment device;
  (B) lubricating said crankcase using a first lubricating oil composition, said first lubricating oil composition optionally containing an extreme-pressure additive comprised of metal and phosphorous, provided the amount of phosphorous contributed to said first lubricating oil composition by said extreme-pressure additive does not exceed about 0.04% by weight based on the weight of said first lubricating oil composition; and
  (C) lubricating said valve train using a second lubricating oil composition;
  said engine being used in combination with an automatic transmission fluid in said automatic transmission.

30. A method of operating a spark ignition four-stroke internal combustion engine comprised of a valve train and a crankcase and equipped with an exhaust gas aftertreatment device, said method comprising:
  (A) operating said engine using a gasoline fuel composition, the exhaust gas from the operation of said engine being advanced through said aftertreatment device;
  (B) lubricating said crankcase using a first lubricating oil composition, said first lubricating oil composition optionally containing an extreme-pressure additive comprised of metal and phosphorus, provided the amount of phosphorus contributed to said first lubricating oil composition by said extreme-pressure additive does not exceed about 0.04% by weight based on the weight of said first lubricating oil composition; and
  (C) lubricating said valve train using a second lubricating oil composition;
  said engine being used in combination with a power steering unit, said second lubricating composition being used as a power steering fluid in said power steering unit.

31. A method of operating a spark ignition four-stroke internal combustion engine comprised of a valve train and a crankcase and equipped with an exhaust gas aftertreatment device, said method comprising:
  (A) operating said engine using a gasoline fuel composition, the exhaust gas from the operation of said engine being advanced through said aftertreatment device;
  (B) lubricating said crankcase using a first lubricating oil composition, said first lubricating oil composition optionally containing an extreme-pressure additive comprised of metal and phosphorous, provided the amount of phosphorous contributed to said first lubricating oil composition by said extreme-pressure additive does not exceed about 0.04% by weight based on the weight of said first lubricating oil composition;
  (C) lubricating said valve train using a second lubricating oil composition;
  (D) removing part of said first lubricating oil composition from said crankcase, said removed part of first lubricating oil composition being combined with the exhaust gas from said engine and removed from said engine with said exhaust gas; and
  (E) adding an additional amount of said first lubricating oil composition to said crankcase to replace said removed part of said first lubricating oil composition.

32. The method of claim 31 wherein said extreme-pressure additive is present and is a compound represented by the formula

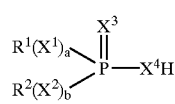

(A)

wherein in Formula (A), $X^1$, $X^2$ and $X^3$ and $X^4$ are independently O or S, a and b are independently zero or 1, and $R^1$, $R^2$ and $R^3$ are independently hydrocarbyl groups and $R^3$ can be hydrogen.

33. The method of claim 31 wherein said first lubricating oil composition further comprises an ash-producing detergent or dispersant.

* * * * *